United States Patent
Liu et al.

(10) Patent No.: US 10,805,149 B2
(45) Date of Patent: Oct. 13, 2020

(54) METHOD FOR AUTOMATICALLY RENOVATING CORRESPONDENCE FAILURE OF ACTUAL AND VIRTUAL ADDRESSES OF NETWORK EQUIPMENT

(71) Applicants: Chao-Jen Liu, New Taipei (TW); Yen-Chen Chen, New Taipei (TW)

(72) Inventors: Chao-Jen Liu, New Taipei (TW); Yen-Chen Chen, New Taipei (TW)

(73) Assignee: ITEX INTERNATIONAL INC., New Taipei (TW)

( * ) Notice: Subject to any disclaimer, the term of this patent is extended or adjusted under 35 U.S.C. 154(b) by 0 days.

(21) Appl. No.: 16/231,982

(22) Filed: Dec. 25, 2018

(65) Prior Publication Data

US 2019/0199579 A1    Jun. 27, 2019

(30) Foreign Application Priority Data

Dec. 26, 2017 (TW) .............................. 106145628 A

(51) Int. Cl.
*H04L 12/24* (2006.01)
*H04L 29/12* (2006.01)
*H04L 12/26* (2006.01)

(52) U.S. Cl.
CPC .......... *H04L 41/0672* (2013.01); *H04L 43/10* (2013.01); *H04L 61/103* (2013.01); *H04L 61/2007* (2013.01); *H04L 61/6009* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 9,100,274 B1* | 8/2015 | Ghosh | H04L 49/70 |
| 2014/0047098 A1* | 2/2014 | Rajah | H04L 45/586 |
| | | | 709/224 |
| 2014/0143591 A1* | 5/2014 | Chiang | G06F 11/2002 |
| | | | 714/4.11 |
| 2016/0080249 A1* | 3/2016 | Lu | H04L 1/22 |
| | | | 370/219 |
| 2017/0005915 A1* | 1/2017 | Mirsky | H04L 45/26 |
| 2017/0118067 A1* | 4/2017 | Vedula | H04L 41/0668 |

* cited by examiner

*Primary Examiner* — Gregory B Sefcheck
*Assistant Examiner* — Srinivasa R Reddivalam

(57) ABSTRACT

The method includes the steps of: a) creating a high availability (HA) network equipment cluster and network connection and assigning a virtual destination IP address (VIP address); b) defining an operating device and a backup device in the HA network equipment cluster, wherein the operating device and the backup device have respective physical addresses (MAC addresses); c) disposing a packet detection controller in the backup device; d) informing the operating device when the packet detection controller detects a packet with the VIP address as a destination; and e) the operating device announcing an ARP (Address Resolution Protocol) broadcast packet with correspondence of the VIP address and its own MAC address to drive an external network device with wrong ARP correspondence to make ARP update.

3 Claims, 2 Drawing Sheets

METHOD FOR AUTOMATICALLY RENOVATING CORRESPONDENCE FAILURE OF ACTUAL AND VIRTUAL ADDRESSES OF NETWORK EQUIPMENT

TECHNICAL FIELD

The invention relates to a method for automatically renovating correspondence failure of actual and virtual addresses of network equipment in a high-availability (HA) system.

RELATED ART

Webpages, domain names, emails, etc. have been fundamental services in intranet of companies. They are an unstoppable part in companies' operation. In recent years, because of fast development and mass-production of hardware equipment, equipment with high performance becomes cheaper and cheaper. A high-availability (HA) system composed of the open-source operating system LINUX and related kit makes companies easy to create a service system with HA.

The high availability system means that network equipment in operation can be immediately transferred to backup equipment to keep an uninterrupted network service when the network equipment in operation malfunctions. Meanwhile, the HA system can also make load balance and reduce an incidence rate of service paused resulting from malfunctions or overload of a single device. To maintain high availability of equipment, a system usually includes two equal and exchangeable devices. A device which is being used is called "operating device", which has a destination IP address, and another device is called "backup device", which has no destination IP address. When the operating device malfunctions or fails, the backup device will be automatically switched to be a new operating device, which takes over the destination IP address first and then announces a broadcast packet through the ARP (Address Resolution Protocol) to broadcast its physical address of Ethernet, i.e. MAC (Media Access Control) address, to other network devices in the same area. As a result, these network devices will send packets with destination IP addresses to the new operating device of the HA system according to the MAC address and update the new address correspondence (correspondence of the destination IP address and the MAC address) to its ARP table.

However, if a network device does not receive the broadcast of address correspondence, it will send a packet to the original and invalid operating device (i.e. present backup device). Particularly, if the invalid device is a gateway router of local area network, then this system will fail to outward communicate and lose the HA mechanism.

SUMMARY OF THE INVENTION

To overcome the above drawbacks, the invention provides a method for automatically renovating correspondence failure of actual and virtual addresses of network equipment, comprising:

a) creating a high availability (HA) network equipment cluster and network connection and assigning a virtual destination IP address (VIP address);

b) defining an operating device and a backup device in the HA network equipment cluster, wherein the operating device and the backup device have respective physical addresses (MAC addresses);

c) disposing a packet detection controller in the backup device;

d) immediately informing the operating device when the packet detection controller detects a packet with the VIP address as a destination; and e) the operating device announcing an ARP (Address Resolution Protocol) broadcast packet with correspondence of the VIP address and its own MAC address to drive an external network device with wrong ARP correspondence to make ARP update.

Thereby, when a packet is delivered to meet a problem of correspondence failure of actual and virtual addresses, by detection of the packet detection controller, the operating device announces an ARP broadcast packet to drive an external network device with wrong ARP correspondence to make ARP update.

In the present invention, a heartbeat detection mechanism is disposed between the operating device and the backup device, and the two devices mutually periodically send a heartbeat packet to each other.

In the present invention, the packet detection controller is a software process, which is preferably disposed in both the operating device and the backup device in advance.

DETAILED DESCRIPTION OF THE INVENTION

Figure 1:
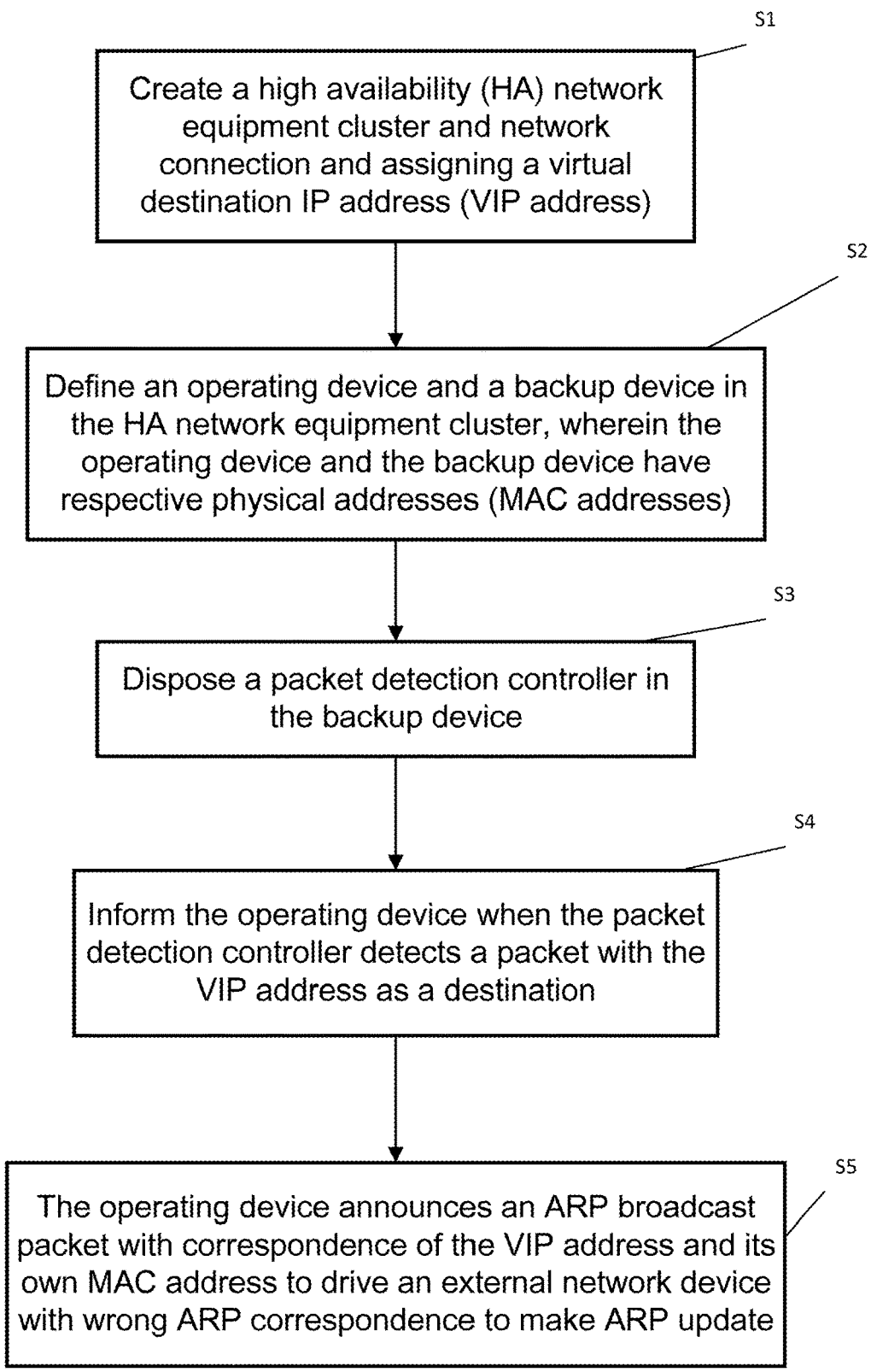
FIG. 1 is a flowchart of the invention.

Please refer to FIG. 1, the invention provides a method for automatically renovating correspondence failure of actual and virtual addresses of network equipment, which includes the steps of:

S1: creating a high availability (HA) network equipment cluster and network connection and assigning a virtual destination IP address (VIP address);

S2: defining an operating device and a backup device in the HA network equipment cluster, wherein the operating device and the backup device have respective physical addresses (MAC addresses);

S3: disposing a packet detection controller in the backup device;

S4: immediately informing the operating device when the packet detection controller detects a packet with the VIP address as a destination; and S5: the operating device announcing an ARP (Address Resolution Protocol) broadcast packet with correspondence of the VIP address and its own MAC address to drive an external network device with wrong ARP correspondence to make ARP update.

Figure 2:
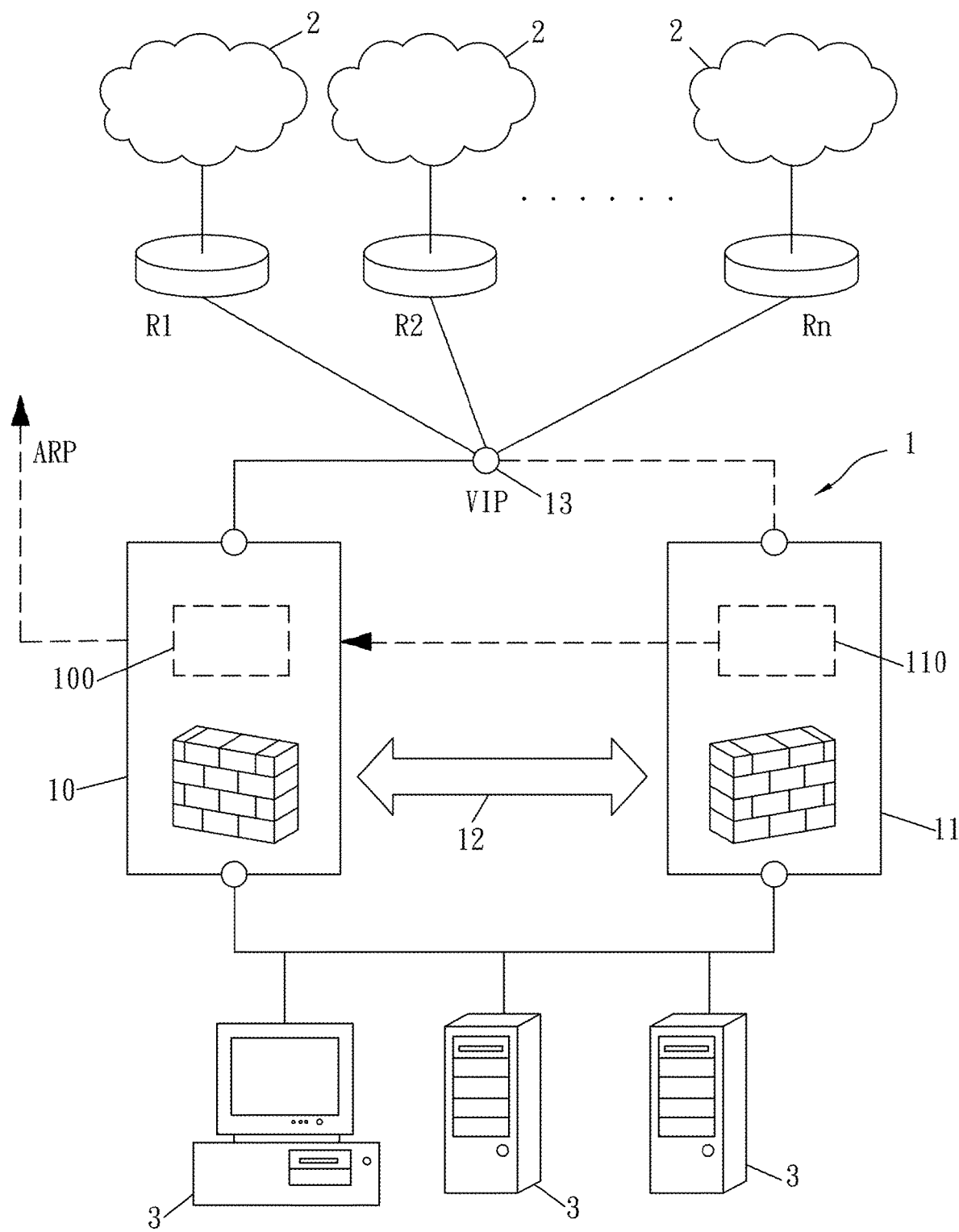
FIG. 2 is a schematic structural view of connection of network devices of the invention.

In detail, please refer to FIG. 2 together, the system of the invention has a network cluster 1 which is connected to internet 2 through gateway router R1~Rn. The network cluster 1 is connected to user ends 3 to provide network services. The network cluster 1 includes a first network device 10 and a second network device 11, which are equal to each other. The first network device 10 is defined as an operating device and the second network device 11 is defined as a backup device. For example, the first and second network devices 10, 11 may be firewalls, but not limited to this. Other devices, such as servers, routers, exchangers, etc.

are available. All software or hardware devices which work in network belong to the network device claimed by the invention.

A heartbeat detection mechanism 12 is disposed between the first network device 10 (i.e. operating device) and the second network device 11 (i.e. backup device). The two network devices 10, 11 mutually periodically send a heartbeat packet to each other. If the second network device 11 (backup device) does not receive a heartbeat packet from the first network device 10 (operating device) in a predetermined time, then the second network device 11 (backup device) will automatically switch to serve as an operating device and take over resources to keep services normally operating. Thus, an HA system is created.

The network cluster 1 is assigned with a virtual destination IP address (VIP address) 13. In the HA system, both the first network device 10 (operating device) and the second network device 11 (backup device) externally use the VIP address as an address to which a destination packet is sent. When one of the network devices malfunctions, the VIP address 13 will be automatically transferred to a present operating device (for example, the first network device 10) and resources will be taken over to keep the system uninterruptedly operating. The second network device 11 serves as a backup device and does not obtain the VIP address 13. Thus, the second network device 11 and the VIP address 13 shown in FIG. 2 are connected by a broken line.

Each of the first and second network devices 10, 11 has a physical address, i.e. MAC1 and MAC2 addresses (MAC stands for Media Access Control), for locating their positions in network. In external communication, one of the physical addresses MAC1 and MAC2 is corresponded to the VIP address 13. A broadcast packet is sent to all devices in the same local area network through the ARP (Address Resolution Protocol), i.e. VIP, MAC1 or VIP, MAC2.

In addition, a packet detection controller is disposed in each of the first and second network devices 10, 11, i.e. a first packet detection controller 100 and a second packet detection controller 110. The packet detection controller 100, 110 may be a software process which is separately loaded in the first and second network devices 10, 11 or sent to the first and second network devices 10, 11 by a server system.

After the first and second packet detection controller 100, 110 have been disposed, when the second network device 11 serves as a backup device and the second packet detection controller 110 detects and captures a packet whose destination is the VIP address 13, it will immediately inform the present operating device (i.e. the first network device 10), and the present operating device (i.e. the first network device 10) will immediately announce an ARP broadcast packet with correspondence of the VIP and its MAC1 address to drive other network devices with wrong correspondence to perform ARP table update. Identically, when the first network device 10 serves as a backup device and the first packet detection controller 100 detects and captures a packet whose destination is the VIP address 13, it will immediately inform the present operating device (i.e. the second network device 11), and the present operating device (i.e. the second network device 11) will immediately announce an ARP broadcast packet with correspondence of the VIP and its MAC2 address to drive other network devices with wrong correspondence to perform ARP table update. As a result, the system can maintain uninterrupted operation and service.

By the above method, when a packet is delivered to meet a problem of correspondence failure of actual and virtual addresses, by detection of the packet detection controller, the operating device announces an ARP broadcast packet to drive an external network device with wrong ARP correspondence to make ARP update. Particularly, by this automatically renovating method, no continuously periodically announcing ARP update is required any longer. This will reduce load of network resources and will not affect performance of the system.

It will be appreciated by persons skilled in the art that the above embodiment has been described by way of example only and not in any limitative sense, and that various alterations and modifications are possible without departure from the scope of the invention as defined by the appended claims.

What is claimed is:

1. A method for automatically renovating correspondence failure of actual and virtual addresses of network equipment, comprising:
   a) creating a high availability (HA) network equipment cluster and network connection and assigning a virtual destination IP address (VIP address);
   b) defining an operating device and a backup device in the HA network equipment cluster, wherein the operating device and the backup device have respective physical addresses (MAC addresses);
   c) disposing a first packet detection controller in the backup device, and a second packet detection controller in the operating device;
   d) informing a wrong address message to the operating device when the first packet detection controller of the backup device detects a packet with the VIP address as a destination; and
   e) the operating device announcing an ARP (Address Resolution Protocol) broadcast packet with correspondence of the VIP address and its own MAC address by the wrong address message from the backup device, to drive an external network device with wrong ARP correspondence to make an ARP table update.

2. The method of claim 1, wherein a heartbeat detection mechanism is disposed between the operating device and the backup device, and the two devices mutually periodically send a heartbeat packet to each other.

3. The method of claim 1, wherein the packet detection controller is a software process.

* * * * *